June 19, 1962   F. R. NICHOLSON   3,039,143
ADJUSTMENT MECHANISM
Filed Sept. 3, 1959
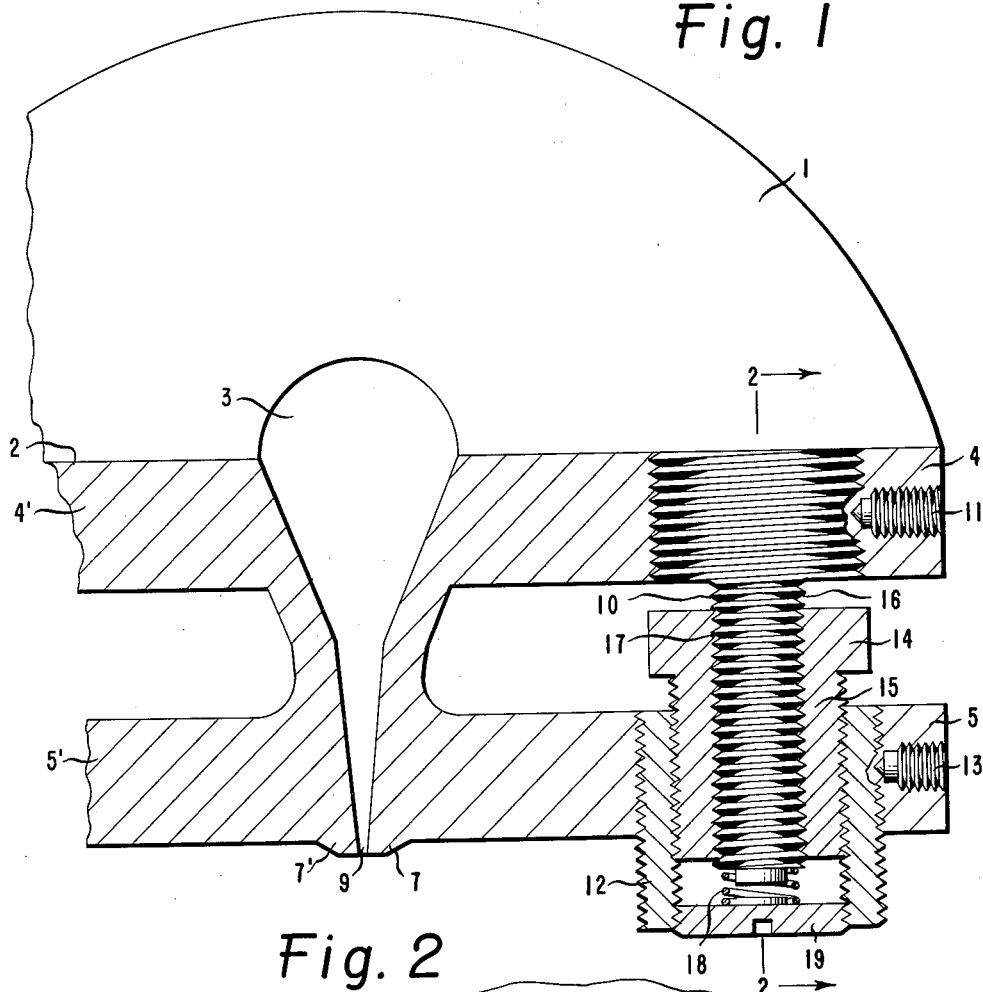
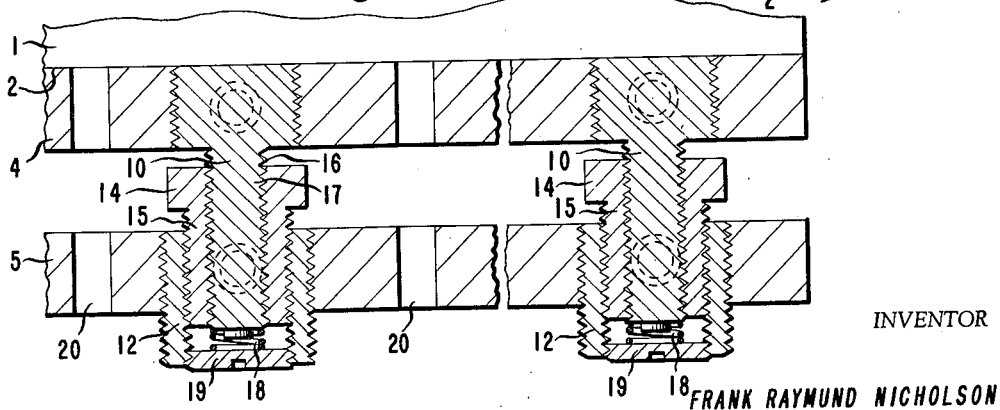
INVENTOR
FRANK RAYMUND NICHOLSON
BY A. Ralph Snyder
ATTORNEY

United States Patent Office 3,039,143
Patented June 19, 1962

3,039,143
ADJUSTMENT MECHANISM
Frank Raymund Nicholson, Circleville, Ohio, assignor to
E. I. du Pont de Nemours and Company, Wilmington,
Del., a corporation of Delaware
Filed Sept. 3, 1959, Ser. No. 837,853
8 Claims. (Cl. 18—12)

This invention relates to an adjustment mechanism, and more particularly to a mechanism especially adapted for the precise adjustment of the orifice lips of film extrusion apparatus.

The employment of adjustment mechanisms is indispensible to a great many mechanical processes and apparatus. Important applications of precision adjustment devices may be found in the adjustment of slot widths in flat film extrusion dies, and in the adjustment of the distance between nips of doctor rolls used in such applications as the coating of polymeric films. The existing designs of such adjustment mechanisms, however, all suffer from several disadvantages. For example, in the conventional type differential type screws used for adjustment of the slot widths of flat film extrusion dies, the following drawbacks are noted: (1) Occurrence of "dead spots" causing a lag in response of thickness adjustment to movement of the adjustment bolt. (2) Instability of extrusion hopper lip to pressure and temperature changes. (3) Because of dead spots, a specific bolt position does not represent a specific lip position and thus no visual indication of shape of hopper lip is possible and it is difficult to return the hopper lip to its initial shape. (4) In order to minimize instability due to "dead spots," no separation of the adjusting bolt segments by machined slot is permissible. As a consequence overstrain of hopper lips results due to the excessively high load required on adjustment bolts; moreover, very high loads are required for any adjustment of the hopper lip, frequently resulting in jammed adjusting bolts.

It is an object of this invention, therefore, to provide an improved mechanism which permits the precise, rapid and positive adjustment of mechanical elements. A more specific object is to provide a differential screw adjustment mechanism particularly for use in flat film extrusion dies, which (1) eliminates "dead spots" by applying a heavy spring loading force on the adjustment bolts; (2) eliminates instability of hopper lips to temperature and pressure changes; (3) permits separation of the adjusting bolt segments by machined slots, which reduces the load put on the adjustment bolt thereby reducing the risk of overstraining the hopper lips, and also permits a reduction of the stiffness in the hopper lip, thereby eliminating jamming of the adjustment bolts; and (4) allows for visual indication for shape of the hopper lip.

These objects are realized by the present invention which, briefly stated, comprises in combination, two spaced, parallel body members the first of said body members having a stationary cylindrical, interiorly screw-threaded sleeve mounted therein, a stationary screw-threaded cylindrical shaft attached to and projecting from the second of said body members into said sleeve, a nut threadably engaging said shaft and provided with a cylindrical skirt having external screw threads in engagement with the threads of said sleeve, the pitch of said external threads being greater or less than the pitch of the internal threads of said nut, spring means in said sleeve abutting against the end of said shaft, and a screw plug threadably engaging the threads of said sleeve and abutting against said spring means to maintain said spring means under compression against said shaft.

Because of its commercial importance, particular emphasis in the description and illustrations to follow will be placed on the employment of mechanism of the present invention in flat film extrusion apparatus. It is to be understood, however, that the application of the mechanism of the present invention is not restricted to flat film extrusion dies alone, but may be ideally applied to any situation where elimination of backlash (free play) in a differential adjusting mechanism is deemed mandatory. For example, it may be applied in the use of adjusting screws on doctor rolls in the coating towers used for the application of coatings to polymeric films.

As mentioned hereinbefore, a principal application of the mechanism of this invention is in flat film extrusion apparatus. FIGURE 1 illustrates the mechanism adapted to a typical extrusion apapratus which, broadly stated, comprises a main body section 1 having a machined flat bottom 2 to either side of a longitudinal channel 3. Two co-acting lip members are mounted on main body member 1 at each side of channel 3 extending lengthwise of the main body member. These lip members are U-shaped and comprise upper arms 4 and 4' respectively machined to closely seat on the flat surface 2; lower arms 5 and 5', respectively; and dependent straight-edged lips 7 and 7' respectively, defining extrusion orifice 9 which, together with channel 3, is sealed by suitable end plates (not shown). The lip members are identical in construction except that they are reversed in position. The lip members are constructed of a material which permits springing of the lower arm to or away from the upper arm with a comitant movement of the lip edge. Each of the differential screw mechanisms adapted to provide adjustment of the lip members comprises a stationary machine screw-threaded shaft 10 mounted on and depending from the upper arm of the lip member. Preferably, this shaft is removably mounted in the upper arm by screw-thread engagement and is locked in position by a suitable set screw 11. In register with and adapted to receive the lower portion of shaft 10 is a cylindrical, screw-threaded, stationary sleeve 12, mounted in the lower arm of the lip member, preferably by screw engagement and locked in position by set screw 13. An adjusting nut, comprising a head 14 having flattened surfaces (adapted to engage a wrench), and a threaded skirt 15, threadably engages both the shaft and the sleeve. The pitch of the external threads 16 of the shaft bears a ratio to the pitch of the internal threads 17 of the nut such that the springable lower arm of the lip member is brought closer to, or forced away from the upper arm a predetermined distance with each turn of the nut. A spring loading element 18, e.g., a coil or disc spring, for applying a predetermined pressure on the threaded shaft at its lower extremity is located within the bushing. A plug 19 threadably engaged in the bushing at the lower end thereof serves as a seat for the spring and also as a means for adjusting the pressure to be exerted by the spring.

In assembling the device, the upper stationary shaft 10 is screwed into the adjusting nut until the desired clearance is obtained. The bushing is screwed onto the adjusting nut until the proper clearance is obtained between the upper edge of the sleeve 12 and the lower end of the upper stationary shaft. Holding the shaft, adjusting nut and the sleeve in the position listed above, the spring loading element 18 is inserted. Any conventional type of spring such as helical or leaf springs may be employed. Disc (Belleville) type springs are preferred, however, since they occupy a minimum of physical volume, have greater flexibility in the choice of the load deflection characteristics and provide high loading forces. It will be noted that in any case, the spring force itself must be high enough to move the lip to its full extreme of travel. Thus the adjusting nut not only serves to limit the travel, and the threads of the nut are always under a loading force.

The plug 19 is screwed into the sleeve 12 (still retaining the shaft, adjusting nut and sleeve in fixed position), screwed down solid and backed off the required number of turns such that the necessary spring loading is always maintained and yet allow sufficient clearance to give the required movement of the lip. The entire assembly is then threaded simultaneously into the upper and lower arms 4 and 5 and locked in position by tightening of the set screws.

FIGURE 2 illustrates a front elevation cross sectional view with parts in section of the differential adjustment mechanism as it is employed in an extrusion apparatus such as shown in FIGURE 1. A plurality of the differential extrusion mechanisms are threadably engaged in the upper and lower arms of the lip member. Because the differential adjustment mechanisms are virtually "solid" connections, individual adjustment segments are able to be maintained by means of machined cuts 20. This reduces stiffness in the lip members and therefore the load on the adjusting nut thereby eliminating "jamming" of the adjusting nuts.

The extrusion apparatus such as used in the extrusions of flat film of materials such as polyethylene terephthalate, polyethylene, etc., might comprise one or two adjustable lip members having a series of differential adjustment mechanisms at equally spaced apart locations. The differential movement (movement of the adjusting nut) in the differential adjusting mechanism will be determined by the ratio of the pitch of the internal threads of the adjusting nuts to the pitch of the external threads. In cases such as the extrusion of polyethylene terephthalate where fine adjustments are necessary (microinches) the change in separation between the upper and lower arms of the lip member must be limited to a small amount per turn of the adjusting nut. For example, if the upper and lower sections are to move relatively by .005" for a single turn of the adjusting nut, a suitable ratio of the pitch of the internal/external threads of the nut would be $\frac{1}{24}$" and $\frac{1}{28}$". For coarser movement, such as 0.0143" per turn of the nut, a pitch ratio of $\frac{1}{20}$" to $\frac{1}{28}$" would be suitable. As mentioned hereinbefore, however, the pressure of the spring loading mechanism must be capable of moving the lip to its full extreme of travel, and the adjusting nut serves only to limit the movement to the desired position. The total range of adjustment is controlled by the number of turns that can be applied to the nut. For example in FIGURE 1, if in the above example the spacing between the upper surface of adjusting nut and the lower edge of screw is $\frac{5}{32}$", the available turns of the nut are $\frac{5}{32}$" divided by $\frac{1}{24}$, equal to $3\frac{3}{4}$ turns Similarly, the available turns in the other direction would be $\frac{5}{32}$" divided by $\frac{1}{28}$, equal to $4\frac{3}{8}$ turns. The type of spring, therefore, must be carefully chosen so that a suitability high load is maintained as the nut travels over the range, $3\frac{3}{4}$ turns to $4\frac{3}{8}$ turns. Disc springs are preferred because they can be made to give a flatter spring characteristic over this travel range, hence keeping the load on the lip at the point of greatest deflection (when the adjusting nut is at the upper end of travel) to a minimum value. The plug (spring preloader) serves to provide the means for compressing the springs to a given mid-position. In the employment of disc springs, one or more stacks of disc springs may be employed to give the desired load characteristic; alternate stacks may have the springs placed alternately convex upwards and convex downwards.

The differential adjustment mechanism of the present invention overcomes many of the disadvantages which have severely limited the use of mechanisms of existing design. This invention eliminates "dead spots" by applying a heavy spring loading force to keep the differential threads of the adjusting mechanism loaded at all times. By eliminating the "dead spots" and hence free play (backlash) in the threads of the adjusting mechanism, immediate positive response is insured. Overstrain on the differential threads of the adjusting mechanism is minimized because positive stops are provided to limit travel. Because free play is eliminated, one position of the adjusting nut represents one position of the device being adjusted. In the case of extrusion apparatus, the gap between the adjusting nut and the base of the hopper lips now gives a positive indication of the shape of the lip member. By returning the adjusting nut to its initial mid-position, the lip member can be returned to its initial unstrained position or to any former position by merely setting the gaps to the selected position. Because the adjusting mechanisms are virtually "solid" connections, individual adjusting segments are able to be separated by machine cuts reducing the lip member stiffness and loads on the adjusting nut, thereby materially eliminating jamming of the adjusting nuts. The differential adjusting mechanism is readily accessible which is of considerable importance in extrusion apparatus. The differential adjustment mechanism of the present invention is ideally suited for use in extrusion apparatus. It may be ideally employed, however, in any situation wherein elimination of backlash (free play) is mandatory in a differential adjusting mechanism.

I claim:

1. An adjustment mechanism comprising in combination two parallel, spaced body members, the first of said body members having a cylindrical, screw-threaded opening therein; the second of said body members having a threaded cylindrical shaft projecting therefrom in alignment with said opening; a nut having a skirt provided externally with threads, said nut being in threaded engagement with the threads of said shaft and the skirt thereof being in threaded engagement with the threads of said opening, the pitch of the external threads of said skirt being different from the internal threads of said nut; and spring means abutting the free extremity of said shaft, adapted to maintain a continuing pressure against the end of said shaft.

2. An adjustment mechanism comprising in combination two spaced, parallel body members the first of said body members having a cylindrical interiorly screw-threaded sleeve mounted therein and stationary with respect to said first body member; a screw-threaded cylindrical shaft attached to and projecting from the second of said body members into said sleeve, said shaft being stationary with respect to said second body member; a nut threadably engaging said shaft and having a cylindrical skirt having external screw threads in engagement with the threads of said sleeve, the pitch of said external threads being different from the pitch of the internal threads of said nut; spring means in said sleeve abutting against the end of said shaft; and a screw plug threadably engaging the threads of said sleeve and abutting against said spring means to maintain said spring means under compression against said shaft.

3. The mechanism of claim 2 wherein said sleeve and said shaft are in threaded engagement with said first and second body members respectively; said body members being provided with set screws adapted to lock said sleeve and said shaft in position.

4. The mechanism of claim 2 wherein said spring means is a disc type spring.

5. A mechanism for precisely adjusting the orifice lips of a flat film extrusion apparatus comprising in combination, a body member having a lengthwise channel in its bottom surface, a pair of spaced-orifice defining lip members on each side of said channel attached to its bottom surface and end plates for said body and lip members, at least one of said orifice-defining lip members being U-shaped and comprised of an upper arm bearing against and attached to the bottom of said body member, a lower arm, and a closed end the outer surface of which constitutes a hopper lip; a plurality of identical internally screw-threaded cylindrical sleeves fixedly mounted in said lower arm at spaced intervals, threaded cylindrical shafts fixedly mounted on and depending from said upper arm in alignment with said sleeves, spring means abutting the free extremity of the shafts adapted to maintain a continuing pressure against the ends of said shafts and to maintain said orifice defining lip in a predetermined position, and nuts having skirts provided externally with threads, said nuts being in threaded engagement with the threads of said shafts and the skirts thereof being in threaded engagement with the threads of said sleeves, the pitch of the external threads of said skirts being different from the pitch of the internal threads of said nuts, said nuts adapted to limitedly move said orifice defining lip from its predetermined position thereby varying the orifice opening.

6. A mechanism for precisely adjusting the orifice lips of a flat film extrusion apparatus comprising in combination, a body member having a lengthwise channel in its bottom surface, a pair of spaced-orifice defining lip members on each side of said channel attached to its bottom surface and end plates for said body and lip members, at least one of said orifice-defining lip members being U-shaped and comprised of an upper arm bearing against and attached to the bottom of said body member, a lower arm and a closed end the outer surface of which constitutes a hopper lip; a plurality of identical internally screw-threaded cylindrical sleeves fixedly mounted in said lower arm at equally spaced intervals, threaded cylindrical shafts fixedly attached to and projecting from said upper arm into said sleeves, spring means in said sleeves abutting against the ends of said shafts, screw plugs threadably engaging the threads of said sleeves and abutting against said spring means to maintain said spring means under compression against said shafts and to maintain said orifice defining lip in a predetermined unstrained position, and nuts threadably engaging said shafts and having cylindrical skirts having external threads in engagement with the threads of said sleeves, the pitch of said external threads of said skirts being different from the pitch of the internal threads of the nuts, said nuts adapted to limitedly move said orifice defining lip from its predetermined unstrained position thereby varying the orifice opening.

7. The apparatus of claim 6 wherein said shafts and said sleeves are in threaded engagement with said upper and lower arms respectively, said arms being provided with set screws adapted to lock said shafts and sleeves in position.

8. The apparatus of claim 6 wherein said spring means is a disc type spring.

References Cited in the file of this patent

UNITED STATES PATENTS

| | | |
|---|---|---|
| 1,990,078 | Kinsella et al. | Feb. 5, 1935 |
| 2,387,718 | Coleman | Oct. 30, 1945 |
| 2,765,492 | Velvel | Oct. 9, 1956 |